United States Patent
Chu et al.

(10) Patent No.: US 8,571,187 B2
(45) Date of Patent: Oct. 29, 2013

(54) METHODS AND APPARATUSES FOR DYNAMICALLY RECOGNIZING TERMS UTILIZED WITHIN ELECTRONIC MAIL MESSAGES

(75) Inventors: Wilson Chu, San Lorenzo, CA (US); Elena Vitorino, San Jose, CA (US); Jimmy Huang, San Jose, CA (US); Richard Iijima, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1903 days.

(21) Appl. No.: 11/549,549

(22) Filed: Oct. 13, 2006

(65) Prior Publication Data

US 2008/0089496 A1   Apr. 17, 2008

(51) Int. Cl.
*H04M 1/64* (2006.01)
(52) U.S. Cl.
USPC ............. 379/88.23; 379/88.11; 379/88.13; 379/88.17; 455/412.1; 455/414.1; 709/201; 715/259; 715/752

(58) Field of Classification Search
USPC ............. 707/602, 603, 706–757, 769–780; 715/259; 455/556.2; 709/217–219, 709/201–203; 379/67.1–88.28, 379/100.01–100.13, 142.04–142.06, 379/142.13–142.15, 201.01; 704/270–278; 706/45–61

See application file for complete search history.

(56) References Cited

U.S. PATENT DOCUMENTS

| | | | |
|---|---|---|---|
| 7,457,798 B2 * | 11/2008 | Capps | 1/1 |
| 7,743,045 B2 * | 6/2010 | Guha | 707/706 |
| 7,788,590 B2 * | 8/2010 | Taboada et al. | 715/761 |
| 2004/0205672 A1 * | 10/2004 | Bates et al. | 715/533 |
| 2005/0261962 A1 * | 11/2005 | Chuah | 705/14 |
| 2008/0168141 A1 * | 7/2008 | Keohane et al. | 709/206 |
| 2008/0178073 A1 * | 7/2008 | Gao et al. | 715/243 |
| 2009/0241102 A1 * | 9/2009 | Wang | 717/171 |

* cited by examiner

*Primary Examiner* — Hemant Patel

(57) ABSTRACT

In one embodiment, the methods and apparatuses detect a message; detect a message term within the message; search for a match between the message term and a stored term; and display a description based on the match wherein the description is utilized for describing the message term and the description corresponds with the stored term.

19 Claims, 7 Drawing Sheets

METHODS AND APPARATUSES FOR DYNAMICALLY RECOGNIZING TERMS UTILIZED WITHIN ELECTRONIC MAIL MESSAGES

FIELD OF INVENTION

The present invention relates generally to recognizing terms and, more particularly, to dynamically recognizing terms utilized within electronic mail messages.

BACKGROUND

Electronic mail applications such as Outlook® and Tiger Mail® allow users to search for specific electronic mail messages by searching for a term or key word. The user can search for the term or key word in the body of the message, the subject line of the message, the sender, and/or the recipient. Further, the user can search for messages by date sent.

SUMMARY

In one embodiment, the methods and apparatuses detect a message; detect a message term within the message; search for a match between the message term and a stored term; and display a description based on the match wherein the description is utilized for describing the message term and the description corresponds with the stored term.

BRIEF DESCRIPTION OF THE DRAWINGS

The accompanying drawings, which are incorporated in and constitute a part of this specification, illustrate and explain one embodiment of the methods and apparatuses for dynamically recognizing terms utilized within electronic mail messages.

In the drawings.

DETAILED DESCRIPTION

The following detailed description of the methods and apparatuses for dynamically recognizing terms utilized within electronic mail messages refers to the accompanying drawings. The detailed description is not intended to limit the methods and apparatuses for dynamically recognizing terms utilized within electronic mail messages. Instead, the scope of the methods and apparatuses for dynamically recognizing terms utilized within electronic mail messages is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

Figure 1:
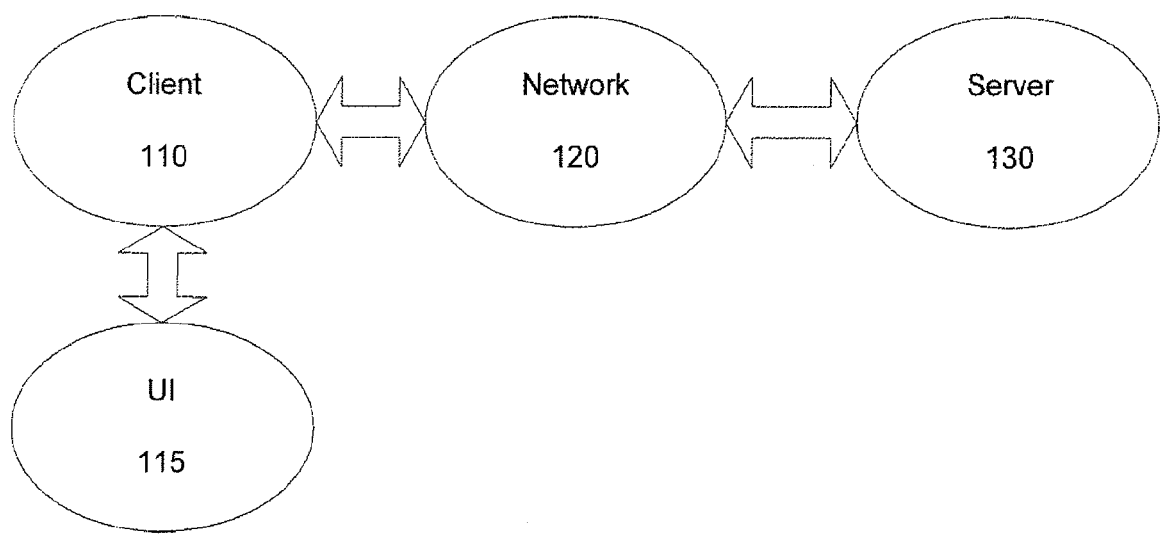
FIG. 1 is a diagram illustrating an environment within which the methods and apparatuses for dynamically recognizing terms utilized within electronic mail messages are implemented.

FIG. 1 is a diagram illustrating an environment within which the methods and apparatuses for dynamically recognizing terms utilized within electronic mail messages are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of dynamically enforcing privileges during a data collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
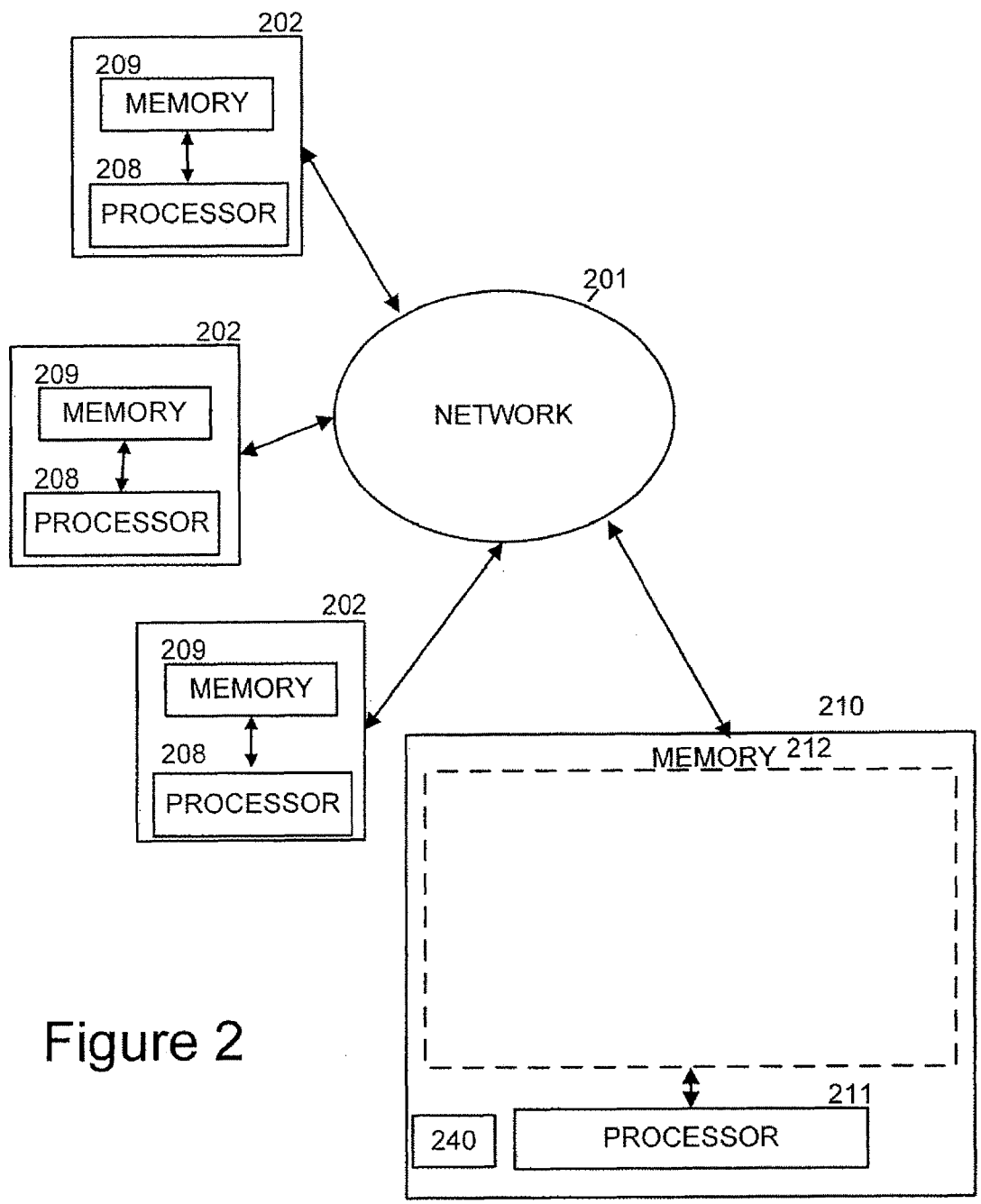
FIG. 2 is a simplified block diagram illustrating one embodiment in which the methods and apparatuses for dynamically recognizing terms utilized within electronic mail messages are implemented.

FIG. 2 is a simplified diagram illustrating an exemplary architecture in which the methods and apparatuses for dynamically recognizing terms utilized within electronic mail messages are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for dynamically recognizing terms utilized within electronic mail messages. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on dynamically enforcing privileges during a data collaboration sessions determined using embodiments described below.

Figure 3:
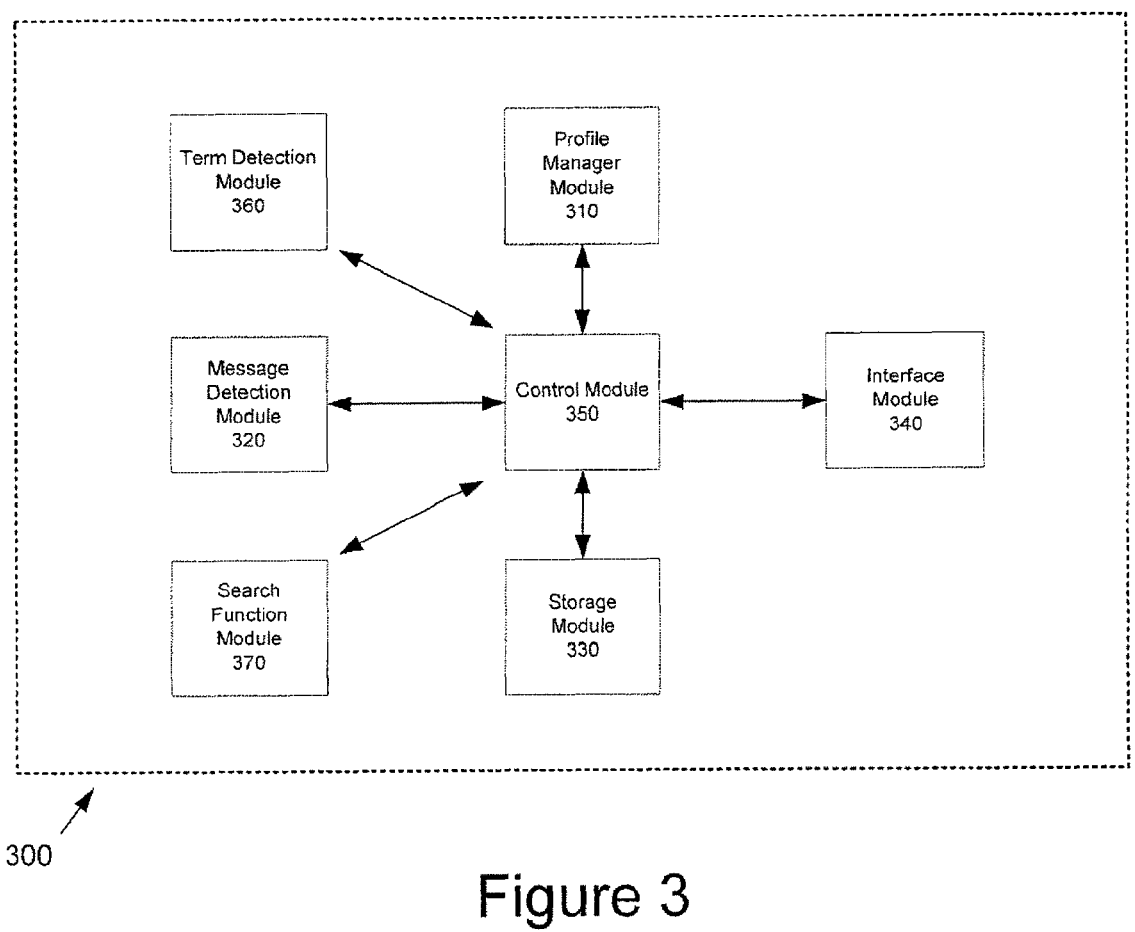
FIG. 3 is a simplified block diagram illustrating a system, consistent with one embodiment of the methods and apparatuses selectively controlling a remote device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a message detection module 320, a storage module 330, an interface module 340, a control module 350, a term detection module 360, and search module 370.

In one embodiment, the control module 350 communicates with the profile manager module 310, the message detection module 320, the storage module 330, the interface module 340, the term detection module 360, and the search module 370. In one embodiment, the control module 350 coordinates tasks, requests, and communications between the profile manager module 310, the message detection module 320, the storage module 330, the interface module 340, the term detection module 360, and the search module 370.

In one embodiment, the profile manager module 310 organizes and tracks the profiles. In one embodiment, each profile corresponds to a specific user account associated with a particular electronic message account. In another embodiment, each profile corresponds to a plurality of electronic message accounts. For example, the plurality of electronic message accounts may belong to a single company. In another embodiment, the plurality of electronic message accounts may belong to multiple companies.

In one embodiment, the message detection module 320 detects and identifies the electronic mail message. In one embodiment, the message detection module 320 detects electronic messages that are transmitted through the network 120. In one embodiment, the message detection module 320 is capable of detecting electronic messages that are sent or received by any of the user accounts associated with the profile.

In one embodiment, the storage module 330 stores a record including a profile associated with the each device, user, electronic mail account, or group of electronic mail accounts. An exemplary profile is shown in a record 400 within FIG. 4.

In one embodiment, the storage module 330 stores electronic mail messages. Further, the storage module 330 is configured to store various terms and definitions corresponding to a term.

In one embodiment, the interface module 340 detects electronic messages transmitted between accounts and user interaction from a device through the network 120.

In one embodiment, the interface module 340 displays suggested definitions to terms displayed within an electronic message. In another embodiment, the interface module 340 allows definitions to be applied to new terms associated with the content from an electronic message.

In one embodiment, the term detection module 360 is configured to detect a term within the electronic mail message. In one embodiment, the term detection module 360 detects a defined term within the electronic mail message. For example, the term detection module 360 monitors electronic mail messages and identifies a defined term within the electronic mail messages that were previously stored. In one embodiment, these previously stored defined terms are located within the storage module 330.

In another embodiment, the term detection module 360 detects a new, undefined term based on the frequency of occurrence of this undefined term. For example, the undefined term is detected if this term is detected within the electronic mail messages more than the predetermined threshold.

In one embodiment, the search module 370 is configured to find a definition that corresponds to the undefined term. In one embodiment, the definition of the undefined term is located from a database that functions as a dictionary. In another embodiment, the undefined term is defined by the context of the electronic message that includes the undefined term. Further, the undefined term is defined by the context of multiple electronic messages that include the undefined term.

The system 300 in FIG. 3 is shown for exemplary purposes and is merely one embodiment of the methods and apparatuses for dynamically recognizing terms utilized within electronic mail messages. Additional modules may be added to the system 300 without departing from the scope of the methods and apparatuses for dynamically recognizing terms utilized within electronic mail messages. Similarly, modules may be combined or deleted without departing from the scope of the methods and apparatuses for dynamically recognizing terms utilized within electronic mail messages.

Figure 4:
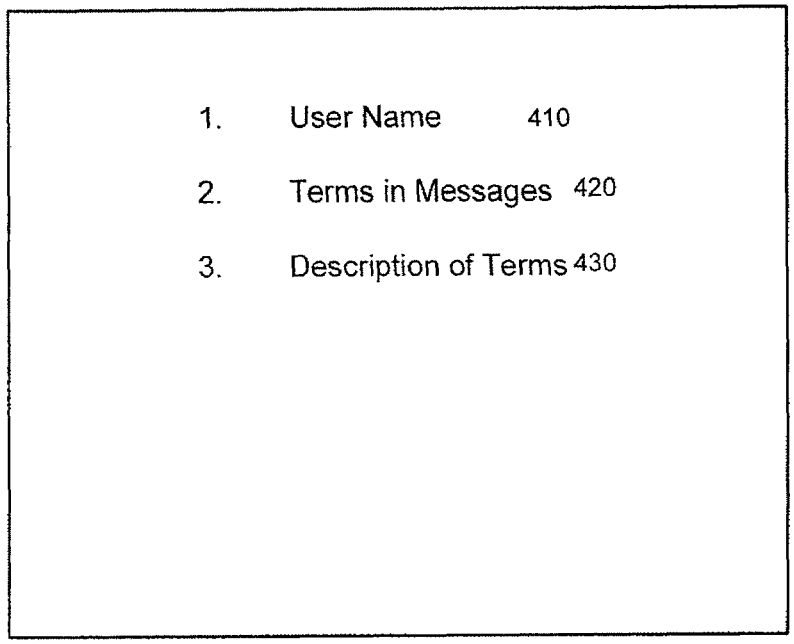
FIG. 4 is an exemplary record for use with the methods and apparatuses for dynamically recognizing terms utilized within electronic mail messages.

FIG. 4 illustrates an exemplary record 400 for use with the methods and apparatuses for dynamically recognizing terms utilized within electronic mail messages. In one embodiment, the record 400 illustrates an exemplary record associated with managing terms within messages and tracking the definitions of these terms.

In one embodiment, there are multiple records such that each record 400 is associated with a particular user, device, or group of users. Further, each device or user may correspond with multiple records wherein each record 400 is associated with a particular profile associated with the device.

In one embodiment, the record 400 includes a user name field 410, a terms in messages field 420, and a description of terms field 430. In one embodiment, the record 400 resides within the client 110. In another embodiment, the record 400 resides within the server 130.

In one embodiment, the user name field 410 includes information related to a user, a device, or group. For example, the user name field 410 may include a company name that includes the group of accounts, a department associated with multiple accounts, and a single account associated with a user.

In one embodiment, the terms in messages field 420 includes terms that are detected within an electronic mail message associated with the individual or group identified within the user name field 410. The terms may include references to information within a sender field, a recipient field, a carbon copy field, a subject line, a date sent field, a date received field, and a body area. Further, the detected terms may also be indexed and stored within the terms in messages field 420.

The terms within the terms in message field 420 may not be detected within an electronic mail message associated with the user name field 410. In another embodiment, the terms within the terms in message field 420 may be originally detected within the record 400 belonging to a different entity from the entity referenced in the current user name field 410.

In one embodiment, the description of terms field 430 includes definitions associated with the particular terms within the terms in messages field 420.

Figure 5:
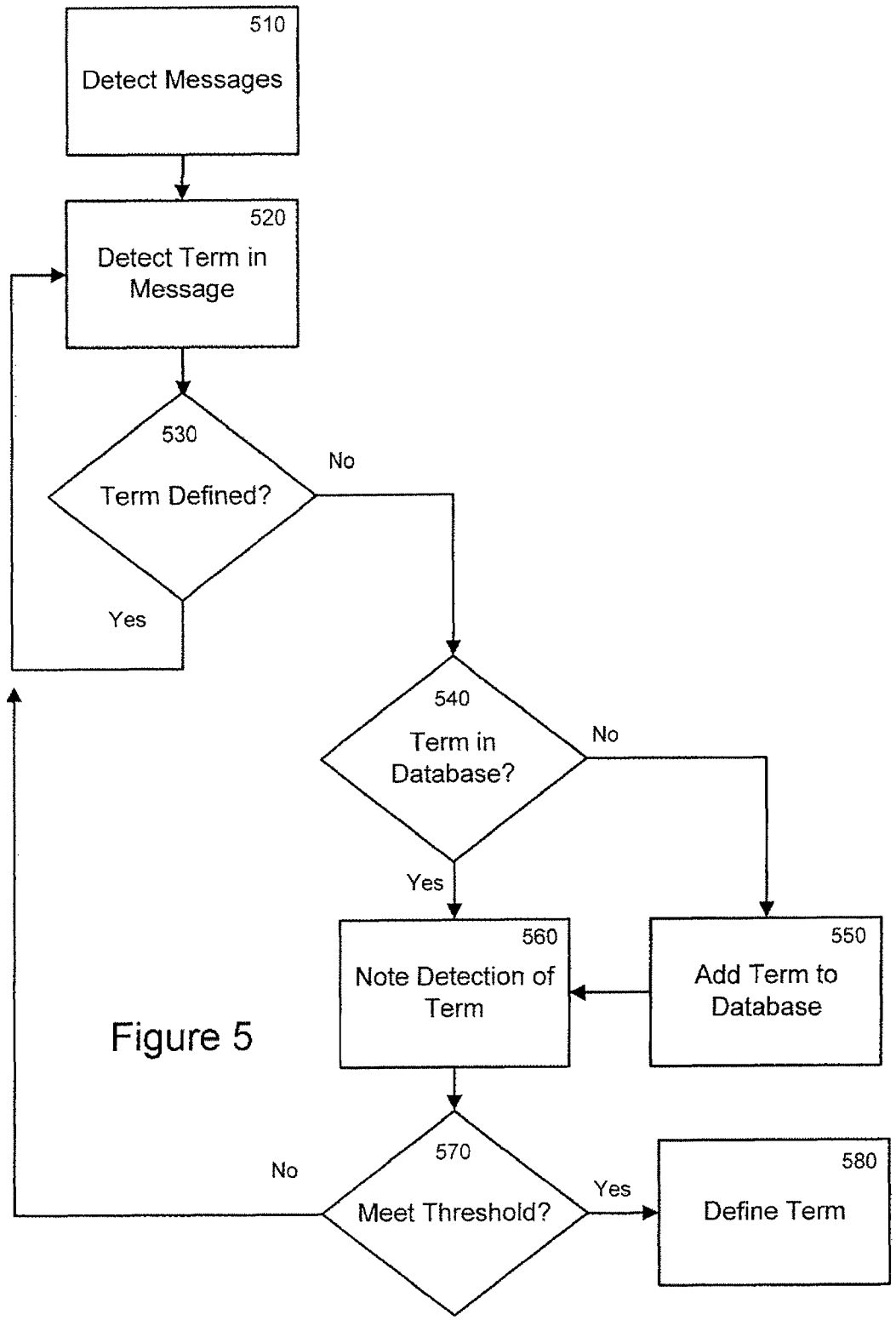
FIG. 5 is a flow diagram consistent with one embodiment of the methods and apparatuses for dynamically recognizing terms utilized within electronic mail messages.
Figure 6:
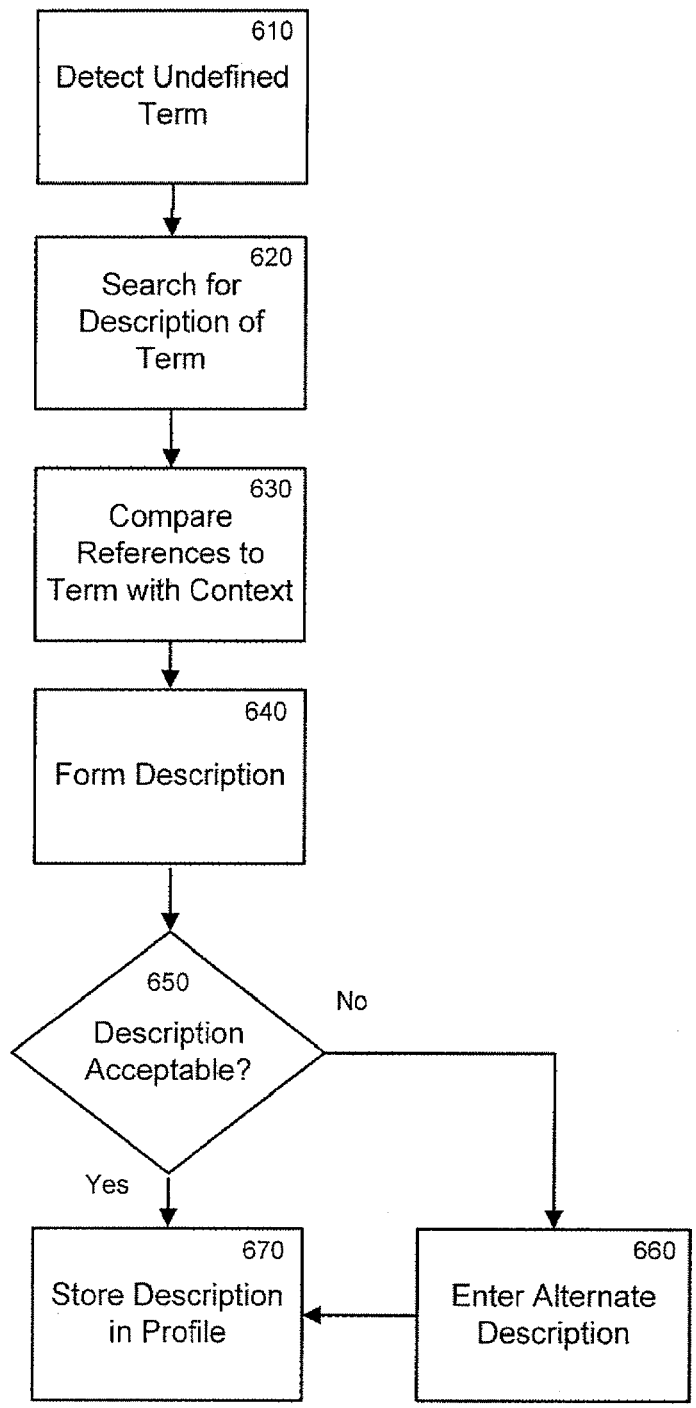
FIG. 6 is a flow diagram consistent with one embodiment of the methods and apparatuses for dynamically recognizing terms utilized within electronic mail messages.
Figure 7:
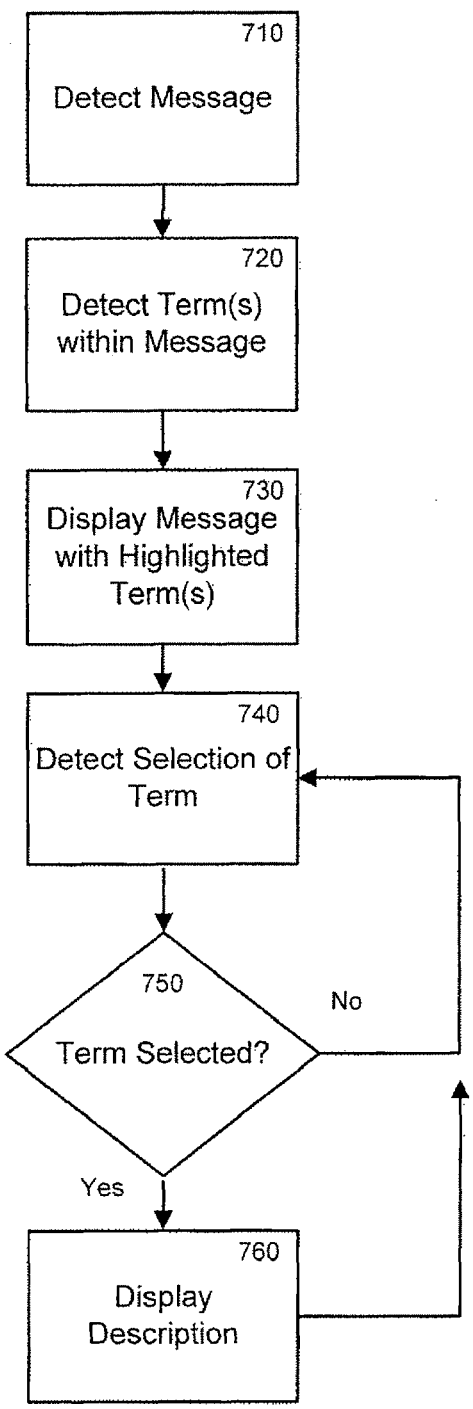
FIG. 7 is a flow diagram consistent with one embodiment of the methods and apparatuses for dynamically recognizing terms utilized within electronic mail messages.

The flow diagrams as depicted in FIGS. 5, 6, and 7 are one embodiment of the methods and apparatuses for dynamically recognizing terms utilized within electronic mail messages. The blocks within the flow diagrams can be performed in a different sequence without departing from the spirit of the methods and apparatuses for dynamically recognizing terms utilized within electronic mail messages. Further, blocks can be deleted, added, or combined without departing from the spirit of the methods and apparatuses for dynamically recognizing terms utilized within electronic mail messages.

The flow diagram in FIG. 5 illustrates defining terms for use in an exemplary record according to one embodiment of the invention.

In Block 510, a message is detected. In one embodiment, the message is an electronic mail message.

In Block 520, a term is identified within the message. In one embodiment, the term is a single word. In another embodiment, the term is a group of words.

In Block 530, if the identified term is defined, then another term is detected in the Block 520. In one embodiment, the identified term is compared with other terms that are stored within a database. In one embodiment, the database that stores these terms is located within the storage module 330. If there is a stored term within the database and this stored term also has a definition associated with the stored term, then the identified term is defined.

If the identified term is not defined, then a determination is made whether this identified term is within the database in Block 540.

If the identified term is not within the database, then the term is added to the database in Block 550.

If the identified term is detected within the database in the Block 540, then the detection of this identified term is noted within Block 560.

If the identified term meets a predetermined threshold in Block 570, then the identified term is defined in Block 580. In one embodiment, the predetermined threshold is utilized to ensure that frequently utilized terms are defined and rarely utilized terms to not be defined. In some instances, the predetermined threshold is adjusted based on the number of defined terms that occur within a typical message.

The flow diagram in FIG. 6 illustrates defining a term within a message according to one embodiment of the invention.

In Block 610, an undefined term is detected. For example, the undefined term referenced in the Block 580 is detected within the Block 610.

In Block 620, a description of the undefined term is searched within the message. In one embodiment, the description is identified by seeking terms that are found within the vicinity of the undefined term.

In Block 630, additional references to the term to be defined are searched in other messages. For example, the term to be defined is found in other messages in one embodiment. Further, the additional references to the undefined term are utilized to provide additional details and context information to the description of the undefined term.

In Block 640, the description is formed for the term to be defined.

In Block 650, a determination is made on whether the description from the Block 640 is acceptable. In one embodiment, the determination is made by a person reviewing the description. In another embodiment, the determination is automated by the system 300 by utilizing key words within the formed description to determine suitability. In yet another embodiment, the determination is made by a combination of automated review by the system 300 and manual review by a person.

If the description is acceptable, then the description is stored in Block 670 within the profile as shown within the exemplary record 400.

If the description is not acceptable, then an alternate or modified description is selected within Block 660.

The flow diagram in FIG. 7 illustrates displaying a description of a term within a message according to one embodiment of the invention.

In Block 710, a message is detected.

In Block 720, a term within the message is detected. In one embodiment, the term that is detected has a corresponding description. In one embodiment, the term and corresponding description are stored within the record 400.

In Block 730, the message is displayed. In one embodiment, the term identified within the Block 720 is also displayed within the message. In one embodiment, the identified term is differentiated from the rest of the message. For example, the identified term may be differentiated by highlighting, color of font, size of font, style of font, underlining, italicizing, and the like.

In Block 740, selection of the identified term is detected. In one embodiment, the identified term is selected by placing a cursor near or over the identified term. In another embodiment, the identified term is selected by clicking the cursor near or over the identified term.

In Block 750, if the identified term is selected, then the description associated with the identified term is displayed in Block 760. In one embodiment, the description is displayed within a separate window from the message displayed within the Block 730.

After the description is displayed or if there are no terms selected within the Block 750, detection of selected terms continues within the Block 740.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   detecting an electronic message;
   detecting a message term within the electronic message;
   searching for a match between the message term and a stored term in a database, wherein the database stores a plurality of stored terms and corresponding definitions;
   in response to finding a match between the message term and the stored term in the database, displaying a definition from the database that corresponds to the stored term, wherein the definition defines the message term;
   in response to not finding a match between the message term and the stored term in the database, determining whether a new definition corresponding to the message term should be added to the database based on whether the message term appears a threshold number of times in one or more electronic messages;

in response to determining that the new definition should be added based on the message term appearing a threshold number of times in the one or more electronic messages, forming the new definition based on analysis of a context of the message term within the electronic message and of a context of the message term when used within one or more electronic messages other than the message; and, adding the new definition corresponding to the message term to the database.

2. The method according to claim 1 further comprising selecting the message term based on an input.

3. The method according to claim 2 wherein the input further comprises a cursor near the message term.

4. The method according to claim 2 wherein the input further comprises highlighting the message term.

5. The method according to claim 1 further comprising displaying a marked version of the message term based on the match between the message term and the stored term.

6. The method according to claim 5 wherein the marked version is the message term displayed as a highlighted term.

7. The method according to claim 5 wherein the marked version is the message term displayed as an underlined term.

8. The method according to claim 5 wherein the marked version is the message term displayed with as a different color than the electronic message.

9. The method according to claim 1 wherein the electronic message is an electronic mail message.

10. The method according to claim 1 wherein the electronic message is a textual message.

11. The method according to claim 1 wherein the message term is a textual representation.

12. The method according to claim 1 wherein the message term is a graphical representation.

13. A method comprising:
 detecting a message term within an electronic message;
 searching for an existing stored description associated with the message term;
 determining the existing stored description is unavailable;
 determining the message term appears a threshold number of times in one or more electronic messages;
 in response to the message term appearing a threshold number of times in one or more electronic messages, forming a stored description associated with the message term based on analysis of a context of the message term within the electronic message and of a context of the message term when used within one or more electronic messages other than the message; and
 storing the stored description in a profile.

14. The method according to claim 13 wherein the forming further comprises defining the stored description based, also, on analyzing one or more other electronic messages other than the electronic message that include the message term.

15. The method according to claim 13 wherein the forming further comprises defining the stored description based, also, on a database containing the message term.

16. A system, comprising:
 a processor; and
 a memory configured to store a plurality of software modules executable by the processor, the software modules including,
  a message detection module configured to detect an electronic message,
  a term detection module configured to detect a term within the electronic message,
  a search term processor module configured to match the term with a stored term in a database, wherein the database stores a plurality of stored terms and corresponding definitions, and
  an interface module configured to display a definition corresponding to the stored term, in response to a match being found between the term and the stored term in the database, the interface module further configured to determine a new definition of the term based on analysis of a context of the message term within the electronic message and of a context of the message term when used within one or more electronic messages other than the message and add the new definition to the database, in response to a match not being found between the term within the electronic message and the stored term and the term appearing a threshold number of times in one or more electronic mail messages.

17. The system according to claim 16 further comprising a storage module configured to store the stored term.

18. The system according to claim 16 further comprising a profile module configured to store the electronic message, the term, and the definition.

19. The method according to claim 1, wherein the adding further comprises:
 receiving approval of the new definition by a person reviewing the new definition.

* * * * *

UNITED STATES PATENT AND TRADEMARK OFFICE
CERTIFICATE OF CORRECTION

| | | |
|---|---|---|
| PATENT NO. | : 8,571,187 B2 | Page 1 of 1 |
| APPLICATION NO. | : 11/549549 | |
| DATED | : October 29, 2013 | |
| INVENTOR(S) | : Wilson Chu et al. | |

It is certified that error appears in the above-identified patent and that said Letters Patent is hereby corrected as shown below:

IN THE CLAIMS:

Column 8, Line 6, remove the word "other" after the word "more"

Signed and Sealed this
Fifth Day of April, 2016

Michelle K. Lee
*Director of the United States Patent and Trademark Office*